United States Patent
Nie

(10) Patent No.: US 10,969,623 B2
(45) Date of Patent: Apr. 6, 2021

(54) DISPLAY PANEL, METHOD OF MANUFACTURING SAME, AND TERMINAL

(71) Applicant: Wuhan China Star Optoelectronics Technology Co., Ltd., Hubei (CN)

(72) Inventor: Xiaohui Nie, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/623,675

(22) PCT Filed: Nov. 5, 2019

(86) PCT No.: PCT/CN2019/115816
§ 371 (c)(1),
(2) Date: Dec. 17, 2019

(65) Prior Publication Data
US 2021/0055606 A1    Feb. 25, 2021

(30) Foreign Application Priority Data

Aug. 22, 2019 (CN) .......................... 201910777303.7

(51) Int. Cl.
| G02F 1/13357 | (2006.01) |
| G02F 1/1333 | (2006.01) |
| G09G 3/3225 | (2016.01) |
| G02F 1/135 | (2006.01) |

(52) U.S. Cl.
CPC .. *G02F 1/133603* (2013.01); *G02F 1/133308* (2013.01); *G09G 3/3225* (2013.01); *G02F 1/1351* (2021.01); *G02F 1/133317* (2021.01)

(58) Field of Classification Search
None
See application file for complete search history.

(56) References Cited

U.S. PATENT DOCUMENTS

| 2012/0105778 | A1 | 5/2012 | Fujiyoshi | |
|---|---|---|---|---|
| 2018/0294436 | A1 | 10/2018 | Choi et al. | |
| 2020/0127231 | A1* | 4/2020 | Yun | ...... H01L 51/5253 |
| 2020/0212357 | A1* | 7/2020 | Lim | ...... H01L 51/5253 |
| 2020/0212370 | A1* | 7/2020 | Ye | ...... H01L 51/5253 |
| 2020/0236259 | A1* | 7/2020 | Nakamura | ...... G02F 1/133512 |

FOREIGN PATENT DOCUMENTS

| CN | 108803143 A | 11/2018 |
|---|---|---|
| CN | 109100891 A | 12/2018 |
| CN | 109166889 A | 1/2019 |
| CN | 109307962 A | 2/2019 |
| CN | 109407375 A | 3/2019 |
| CN | 109671858 A | 4/2019 |
| CN | 109904118 A | 6/2019 |

* cited by examiner

*Primary Examiner* — Phu Vu

(57) ABSTRACT

A display panel, a method of manufacturing the same, and a terminal are provided. A buffer layer on an array substrate is provided a blind hole. Compared with the conventional technology, because the buffer layer in the blind hole in the display panel is removed in the present invention, there are less films blocking light when incident light passes through the blind hole, thereby improving the transmittance of the incident light.

6 Claims, 2 Drawing Sheets

DISPLAY PANEL, METHOD OF MANUFACTURING SAME, AND TERMINAL

FIELD

The present disclosure relates to display technologies, and more particularly, to a display panel, a method of manufacturing the same, and a terminal.

BACKGROUND

With rapid development of display industry, display devices with a high screen ratio have become a development trend. A display ratio of the display device has evolved from 16:9 to 18:9. The display device has been developed from irregular screen to a widow's tip screen in turn then to an in-plane boring technique in order to increase the screen ratio of the display device. Because the in-plane boring technique has great challenges about process and yield requirements of the display device, an in-plane blind hole design has become a development trend.

In the current in-plane blind hole design, the in-plane blind hole design of the display device is to place a mobile phone camera under the blind hole. The blind hole penetrates through glass of an array substrate and all layers except a buffer layer on the glass. The blind hole also penetrates a color film layer and a black matrix of a color filter substrate. Because an opening technology of the in-plane blind hole is still insufficient, the optical penetration of the blind hole is low, which affects an image quality of a front camera.

SUMMARY

In view of the above, the present disclosure provides a display panel, a method of manufacturing the same, and a terminal to provide a blind hole at a buffer layer of an array substrate. In comparison with prior art, the disclosure removes the buffer layer in the blind hole to reduce films blocking light when the light incident the blind hole to enhance an optical penetration of the incident light.

In order to achieve above-mentioned object of the present disclosure, one embodiment of the disclosure provides a display panel including a display region, a non-display region, a blind hole defined in the non-display region and a first substrate including a buffer layer. The blind hole is passing through the buffer layer.

In one embodiment of the disclosure, the display panel is a liquid crystal display panel. The display panel further includes a backlight source, a lower polarizer disposed on the backlight source, a first substrate including a pixel array layer, a liquid crystal layer disposed on the first substrate, a second substrate disposed on the liquid crystal layer, wherein the second substrate includes a color resistor and a black matrix, and an upper polarizer disposed on the second substrate. The blind hole is passing through the backlight source, the lower polarizer, the pixel array layer, the color resistor, the black matrix, and the upper polarizer.

In one embodiment of the disclosure, the display panel is an organic light emitting diode (OLED) display panel. The display panel further includes:
a substrate including a driving circuit layer;
a light emitting device layer disposed on the substrate; and
a polarizer disposed on the light emitting device layer;
wherein the blind hole is passing through the driving circuit layer, the light emitting device layer, and the polarizer.

Furthermore, another embodiment of the disclosure provides a terminal including a camera and a display panel. The camera is disposed in the blind hole. The display panel includes a display region and a non-display region. The display panel further includes:
a blind hole defined in the non-display region; and
a first substrate including a buffer layer;
wherein the blind hole is passing through the buffer layer.

In one embodiment of the terminal of the disclosure, the display panel is a liquid crystal display panel. The display panel further includes:
a backlight source;
a lower polarizer disposed on the backlight source;
a first substrate including a pixel array layer;
a liquid crystal layer disposed on the first substrate;
a second substrate disposed on the liquid crystal layer, wherein the second substrate includes a color resistor and a black matrix; and
an upper polarizer disposed on the second substrate;
wherein the blind hole is passing through the backlight source, the lower polarizer, the pixel array layer, the color resistor, the black matrix, and the upper polarizer.

In one embodiment of the terminal of the disclosure, the display panel is an OLED display panel. The display panel further includes:
a substrate including a driving circuit layer;
a light emitting device layer disposed on the substrate; and
a polarizer disposed on the light emitting device layer;
wherein the blind hole is passing through the driving circuit layer, the light emitting device layer, and the polarizer.

Furthermore, another embodiment of the disclosure provides a method of manufacturing a display panel, including steps of:
providing a base substrate;
providing a buffer layer and a first active layer sequentially on the base substrate;
providing a ring trench on the first active layer and providing a second active layer, wherein the ring trench is defining the display panel with a first region and a second region;
providing a gate insulating layer and a pixel array layer sequentially on the second active layer; and
removing the buffer layer in the ring trench, the buffer layer, the second active layer, and the gate insulating layer in the first region.

In one embodiment of the disclosure, a step of providing the first active layer on the buffer layer includes:
providing an amorphous silicon layer on the buffer layer; and
converting the amorphous silicon layer to a poly silicon layer to obtain the first active layer by laser annealing crystallization.

In one embodiment of the disclosure, the step of providing the ring trench on the first active layer and providing the second active layer further includes:
pattering the first active layer to providing the ring trench on the first active layer and providing the second active layer.

In one embodiment of the disclosure, the step of removing the buffer layer in the ring trench, the buffer layer, the second active layer, and the gate insulating layer in the first region includes:

treating an array substrate by laser lift-off to strip the buffer layer in the ring trench, the buffer layer, the second active layer, and the gate insulating layer in the first region.

In one embodiment of the disclosure, the step of treating the array substrate by laser lift-off to strip the buffer layer in the ring trench, the buffer layer, the second active layer, and the gate insulating layer in the first region includes:

removing a residual material of the buffer layer in the ring trench, and a residual material of the buffer layer, the second active layer, and the gate insulating layer in the first region by a cleaning process after stripping.

In one embodiment of the disclosure, the step of providing the gate insulating layer and the pixel array layer sequentially on the second active layer includes:

providing a patterned gate insulating layer and a patterned pixel array layer sequentially on the second active layer.

The display panel of the disclosure provides the display region, the non-display region, the blind hole defined in the non-display region and the first substrate including a buffer layer. The blind hole is passing through the buffer layer. In comparison with prior art, the disclosure removes the buffer layer in the blind hole to reduce films blocking light when the light incident the blind hole to enhance an optical penetration of the incident light.

DETAILED DESCRIPTION

The following description of the embodiments is provided by reference to the drawings and illustrates the specific embodiments of the present disclosure. Directional terms mentioned in the present disclosure, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof.

In the current in-plane blind hole design, the in-plane blind hole design of the display device is to place a mobile phone camera under the blind hole. The blind hole penetrates through glass of an array substrate and all layers except a buffer layer on the glass. The blind hole also penetrates a color film layer and a black matrix of a color filter substrate. Because an opening technology of the in-plane blind hole is still insufficient, the optical penetration of the blind hole is low, which affects an image quality of a front camera.

In view of the above, the present disclosure provides a display panel, a method of manufacturing the same, and a terminal.

one embodiment of the disclosure provides a display panel including a display region, a non-display region, a blind hole defined in the non-display region and a first substrate including a buffer layer. The blind hole is passing through the buffer layer.

Figure 1:
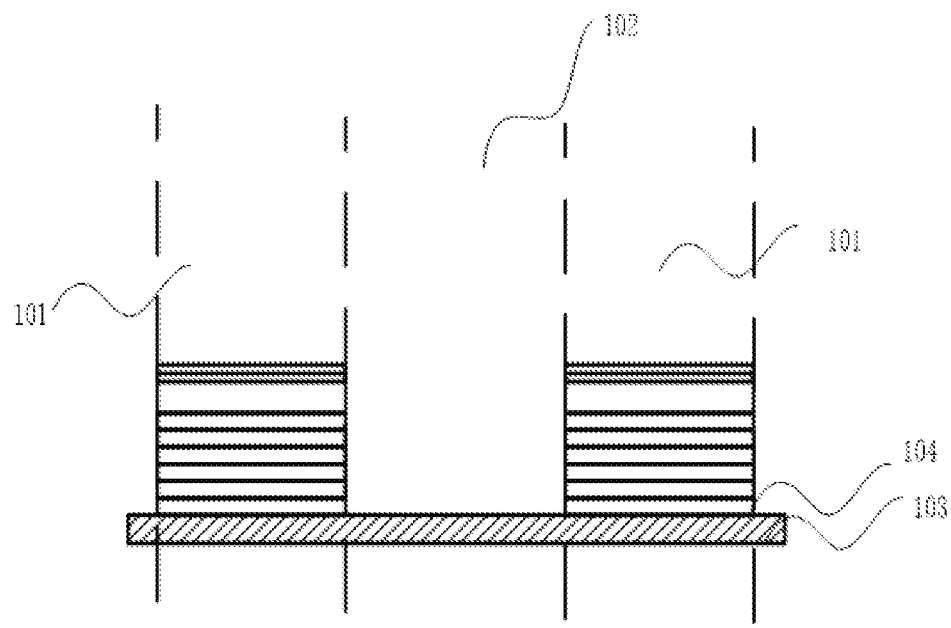
FIG. 1 is a schematic view of a structure of a display panel according to an embodiment of the present disclosure.

FIG. 1 is a schematic view of a structure of a display panel according to an embodiment of the present disclosure. The display panel including a display region 101, a non-display region 102.

In detail, the display region is a region for display words or figures. The display panel further includes:

(1) a blind hole defined in the non-display region 102.

In general, the blind hole is a via hole that connects a surface layer and an inner layer without penetrating an entire plate. The blind holes are located on a top surface and a bottom surface of a printed circuit board and have a depth for connection of circuits on the surface and inner circuits under the surface. The depth of the holes generally does not exceed a certain ratio (aperture), and the depth of the holes in the present application is not limited. It depends on actual situation.

(2) a first substrate 103 including a buffer layer 104.

In detail, the buffer layer may adopt a $SiO_2$ or $Si_3N_4/SiO_2$ double layer structure, to block impurities in the glass from diffusing into the active layer to avoid affecting the threshold voltage of the element. But the buffer layer in the blind hole has a certain light blocking effect, so in order to achieve a better light transmission effect, the buffer layer in the blind hole needs to be removed.

(3) The blind hole is passing through the buffer layer 104.

In detail, the buffer layer in the blind hole will be stripped off.

The display panel of the disclosure provides the display region, the non-display region, the blind hole defined in the non-display region and the first substrate including a buffer layer. The blind hole is passing through the buffer layer. In comparison with prior art, the disclosure removes the buffer layer in the blind hole to reduce films blocking light when the light incident the blind hole to enhance an optical penetration of the incident light.

In view of the above, in one embodiment of the disclosure, the display panel is a liquid crystal display panel. The display panel further includes a backlight source, a lower polarizer disposed on the backlight source, a first substrate including a pixel array layer, a liquid crystal layer disposed on the first substrate, a second substrate disposed on the liquid crystal layer, wherein the second substrate includes a color resistor and a black matrix, and an upper polarizer disposed on the second substrate. The blind hole is passing through the backlight source, the lower polarizer, the pixel array layer, the color resistor, the black matrix, and the upper polarizer.

In view of the above, in one embodiment of the disclosure, the display panel is an organic light emitting diode (OLED) display panel. The display panel further includes: a substrate including a driving circuit layer; a light emitting device layer disposed on the substrate; and a polarizer disposed on the light emitting device layer. The blind hole is passing through the driving circuit layer, the light emitting device layer, and the polarizer.

In detail, the light emitting device layer includes a hole transport layer, a light emitting layer, and an electron transport layer which are disposed in a stack. Existing display devices are using a large number of OLED display panels. In order to achieve a high screen ratio of the OLED display panel, a front camera and other sensing components need to be optimized. In the disclosure, the front camera and other sensing components is disposed in the blind hole by blind hole technologies to effectively increase the screen ratio. In the above embodiment, and signal receiving function of the front camera and the sensing component can be effectively improved when the buffer layer in the first substrate is removed.

In order to implement the display panel in the embodiment of the present invention, based on the display panel, another embodiment of the disclosure provides a terminal including a camera and a display panel abovementioned. The camera is disposed in the blind hole.

The blind hole on a surface of the first substrate opposite another surface of the first substrate facing the second substrate is open to environment. The camera is disposed at the surface of the first substrate opposite the other surface of the first substrate facing the second substrate.

The display panel of the disclosure provides the display region, the non-display region, the blind hole defined in the non-display region and the first substrate including a buffer layer. The blind hole is passing through the buffer layer. In comparison with prior art, the disclosure removes the buffer layer in the blind hole to reduce films blocking light when the light incident the blind hole to enhance an optical penetration of the incident light.

In order to implement the display panel in the embodiment of the present invention, based on the display panel, another embodiment of the disclosure provides a method of manufacturing a display panel, including steps of: providing a base substrate; providing a buffer layer and a first active layer sequentially on the base substrate; providing a ring trench on the first active layer and providing a second active layer, wherein the ring trench is defining the display panel with a first region and a second region; providing a gate insulating layer and a pixel array layer sequentially on the second active layer; and removing the buffer layer in the ring trench, the buffer layer, the second active layer, and the gate insulating layer in the first region.

Figure 2:
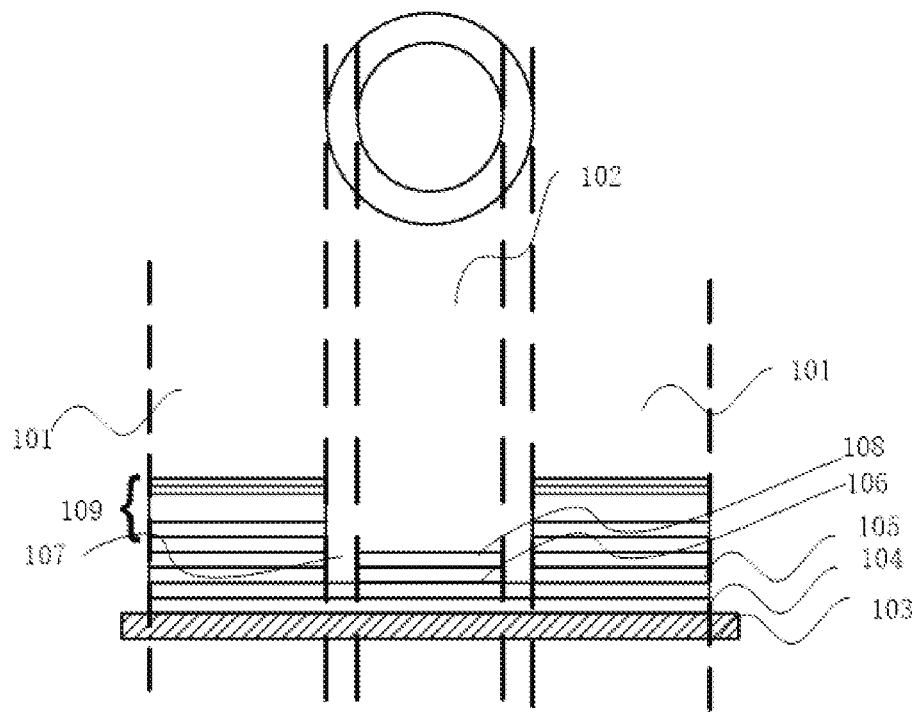
FIG. 2 is a schematic view of a structure of a display panel according to another embodiment of the present disclosure.
Figure 3:
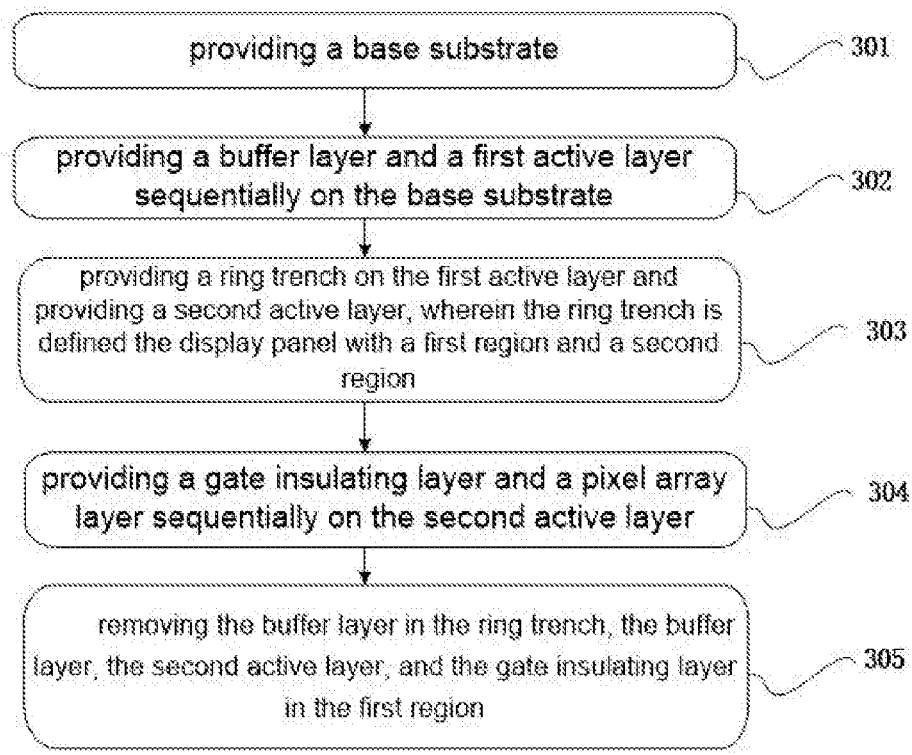
FIG. 3 is a schematic flowchart of a method of manufacturing a display panel according to an embodiment of the present disclosure.

Referring to FIG. 2 and FIG. 3, FIG. 3 is a schematic flowchart of a method of manufacturing a display panel according to an embodiment of the present disclosure. The method includes steps of:

Step 301: providing a base substrate 103.

In detail, the base substrate is made of an inorganic material such as glass.

Step 302: providing a buffer layer 104 and a first active layer 105 sequentially on the base substrate.

In detail, the buffer layer SiNx/SiOx and the active layer amorphous Si are prepared by a chemical vapor deposition process. A film deposition process in the chemical vapor deposition process is: diffusing neutral gas molecules from a upper plate electrode into a vacuum chamber; ionizing the neutral gas molecules by a RF source to form an reactive group; diffusing the reactive group to a surface of the substrate and adsorbing the reactive group by the surface of the substrate; the reactive groups adsorbed on the surface of the substrate reacting to form a new chemical bond; the deposited reactive group on the surface subjected to migration rearrangement and diffused to a position where energy is stable to form a film.

Step 303: providing a ring trench on the first active layer and providing a second active layer 106, wherein the ring trench 107 is defining the display panel with a first region and a second region.

The second region is the display region, and the first region is a region that the blind hole provided. an amorphous silicon is converted into polycrystalline silicon by a laser annealing crystallization process, and the polysilicon is covered and protected by a photoresist. A groove pattern is formed by an exposure process. The groove design has a certain width. The width value of the groove is depending on the actual situation and is not limited in the present application. The pattern is an annular region with the same center of the blind hole. Because an etching process of the display region only etches the polysilicon, the blind hole region and the display region are etched in the same process, so the polysilicon in the annular region is completely etched, and the bottom buffer layer remains, forming an annular trench.

Step 304: providing a gate insulating layer 108 and a pixel array layer 109 sequentially on the second active layer.

In detail, the pixel array layer includes a gate electrode layer, an interlayer dielectric layer, a source/drain metal layer, an organic planarization layer, a common electrode, a passivation layer, and a pixel electrode layer, and each functional film layer are sequentially deposited. Provide a first pattern by lithography process, wherein a blind hole pattern is prepared in the same layer as the first pattern. Provide the gate insulating layer by the chemical vapor deposition. Provide the gate electrode layer by a physical vapor deposition. Provide the interlayer dielectric layer by the chemical vapor deposition. Provide the source/drain metal layer by the physical vapor deposition. Provide the organic planarization layer by coating. Provide the common electrode by the physical vapor deposition. Provide the passivation layer by the chemical vapor deposition. Provide the pixel electrode by the physical vapor deposition. The physical vapor deposition is a thin film deposition method generally performed by sputtering under a certain high vacuum state (at a pressure about 50 Pa). An excitation source is used to provide high energy of the charged particles in the high vacuum state to bombard a surface of a target, so that components (atoms or molecules) on the surface of the target get enough energy to splash onto a surface of another medium (usually a glass substrate). Excited particles are usually inert gases of sufficient atomic mass to lose electrons and positively charge under the action of the excitation source. In general, a kinetic energy of an excited ions needs to be 10 to 25 eV to sputter atoms on a surface of a metal target. This energy value is also known as a sputtering threshold energy. A sputtering gas is generally selected from an inert gas, because it is stable and does not chemically react with the target atoms.

Step 305: removing the buffer layer in the ring trench, the buffer layer, the second active layer, and the gate insulating layer in the first region.

The buffer layer of the annular trench and the buffer layer/polysilicon/active layer remaining in the blind hole region are peeled off by a laser lift-off process using a laser with appropriate energy and appropriate spot, and removed by a cleaning process.

In comparison with prior art, the disclosure of the method of manufacturing the display panel removes the buffer layer in the blind hole to reduce films blocking light when the light incident the blind hole to enhance an optical penetration of the incident light.

In view of the above, in one embodiment of the disclosure, a step of providing the first active layer on the buffer layer includes: providing an amorphous silicon layer on the buffer layer; and converting the amorphous silicon layer to a poly silicon layer to obtain the first active layer by laser annealing crystallization.

Figure 4:
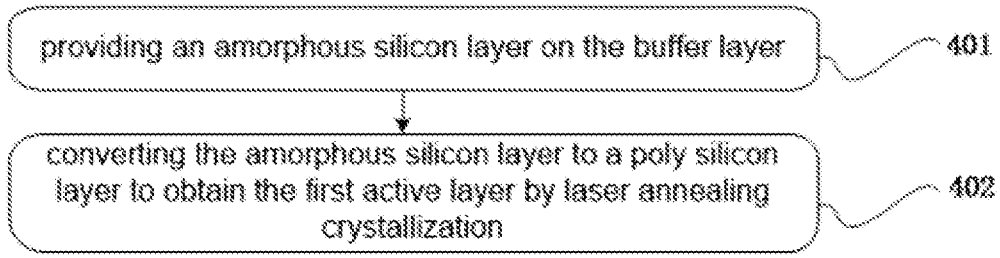
FIG. 4 is a schematic flowchart of a method of manufacturing a display panel according to another embodiment of the present disclosure.

FIG. 4 is a schematic flowchart of a method of manufacturing a display panel according to another embodiment of the present disclosure. The step of providing the first active layer on the buffer layer includes:

Step 401: providing an amorphous silicon layer on the buffer layer.

Provide the amorphous silicon layer on the buffer layer by the chemical vapor deposition.

Step 402: converting the amorphous silicon layer to a poly silicon layer to obtain the first active layer by laser annealing crystallization.

In view of the above, in one embodiment of the disclosure, the step of providing the ring trench on the first active layer and providing the second active layer further includes:

pattering the first active layer to providing the ring trench on the first active layer and providing the second active layer.

In detail, in the patterning process, the first active layer in the blind hole region is protected by a photoresist, and subjected to exposure and development processing to prepare the second active layer with the ring trench.

In view of the above, in one embodiment of the disclosure, the step of removing the buffer layer in the ring trench, the buffer layer, the second active layer, and the gate insulating layer in the first region includes:

treating an array substrate by laser lift-off to strip the buffer layer in the ring trench, the buffer layer, the second active layer, and the gate insulating layer in the first region.

Treat the array substrate by a laser with appropriate energy and appropriate spot to remove the buffer layer of the annular trench and the buffer layer, the polysilicon, and the active layer in the blind hole region, and to remove corresponding films in the blind hole region.

In view of the above, in one embodiment of the disclosure, the step of treating the array substrate by laser lift-off to strip the buffer layer in the ring trench, the buffer layer, the second active layer, and the gate insulating layer in the first region includes:

removing a residual material of the buffer layer in the ring trench, and a residual material of the buffer layer, the second active layer, and the gate insulating layer in the first region by a cleaning process after stripping.

The cleaning process is washed with deionized water.

In view of the above, in one embodiment of the disclosure, the step of providing the gate insulating layer and the pixel array layer sequentially on the second active layer includes:

providing a patterned gate insulating layer and a patterned pixel array layer sequentially on the second active layer.

In detail, the patterning process adopts a photoresist development process. The photoresist development process is a process of forming a pattern by dissolving the photoresist irradiated with ultraviolet rays into the developer after the substrate is exposed. The composition of the photoresist contains a resin, a sensitizer, and a functional solvent. In the exposure process, a region of the photoresist irradiated with ultraviolet rays is cross-linked and decomposed, and then the resin is dissolved into the developer. A region of the photoresist not irradiated with ultraviolet rays is maintained original characteristics about cross-linking to prevent the resin from being dissolved into the developer.

An early developer is a strongly alkaline aqueous solution such as a sodium hydroxide or a potassium hydroxide. Both developers contain a large amount of mobile sodium ions and potassium ions, which may seriously affect electrical properties of a device when remaining on a surface of a film. In a current development process, an aqueous solution of tetramethylammonium hydroxide (TMAH) is usually used for development. The TMAH developer has a very low metal ion concentration that avoids effects of mobile ions on the electrical properties of the device. However, if the development time is too long, the photoresist which is not irradiated with ultraviolet rays will gradually dissolve into the developer.

In the above-mentioned embodiments, points of descriptions of the various embodiments are different. Detailed descriptions not shown in one embodiment may see in another embodiments, and details are not described herein.

In implementation, the foregoing various units or structures may be implemented as a separate entity, or may be implemented in any combination, as the same or several entities. For the implementation of the above various units or structures, refer to the foregoing method embodiments, and details are no longer described again.

For implementation of the foregoing operations, refer to the foregoing embodiments, and details are not described herein again.

The present disclosure of a display panel, a method of manufacturing the same and a terminal has been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:

1. A method of manufacturing a display panel, comprising steps of:
   providing a base substrate;
   providing a buffer layer and a first active layer sequentially on the base substrate;
   providing a ring trench on the first active layer and providing a second active layer, wherein the ring trench is defining the display panel with a first region and a second region;
   providing a gate insulating layer and a pixel array layer sequentially on the second active layer; and
   removing the buffer layer in the ring trench, the buffer layer, the second active layer, and the gate insulating layer in the first region.

2. The method of manufacturing the display panel according to claim 1, wherein a step of providing the first active layer on the buffer layer comprises:
   providing an amorphous silicon layer on the buffer layer; and
   converting the amorphous silicon layer to a poly silicon layer to obtain the first active layer by laser annealing crystallization.

3. The method of manufacturing the display panel according to claim 2, wherein the step of providing the ring trench on the first active layer and providing the second active layer further comprises:
   pattering the first active layer to providing the ring trench on the first active layer and providing the second active layer.

4. The method of manufacturing the display panel according to claim 2, wherein the step of removing the buffer layer in the ring trench, the buffer layer, the second active layer, and the gate insulating layer in the first region comprises:
   treating an array substrate by laser lift-off to strip the buffer layer in the ring trench, the buffer layer, the second active layer, and the gate insulating layer in the first region.

5. The method of manufacturing the display panel according to claim 4, wherein the step of treating the array substrate by laser lift-off to strip the buffer layer in the ring trench, the buffer layer, the second active layer, and the gate insulating layer in the first region comprises:

removing a residual material of the buffer layer in the ring trench, and a residual material of the buffer layer, the second active layer, and the gate insulating layer in the first region by a cleaning process after stripping.

6. The method of manufacturing the display panel according to claim 1, wherein the step of providing the gate insulating layer and the pixel array layer sequentially on the second active layer comprises:

providing a patterned gate insulating layer and a patterned pixel array layer sequentially on the second active layer.

* * * * *